US012763077B2

(12) United States Patent
Kaminuma

(10) Patent No.: US 12,763,077 B2
(45) Date of Patent: Oct. 13, 2026

(54) VOICE RECOGNITION METHOD AND VOICE RECOGNITION DEVICE

(71) Applicant: Nissan Motor Co., Ltd., Kanagawa (JP)

(72) Inventor: Atsunobu Kaminuma, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 174 days.

(21) Appl. No.: 18/832,374

(22) PCT Filed: Jan. 26, 2022

(86) PCT No.: PCT/IB2022/000040
§ 371 (c)(1),
(2) Date: Jul. 23, 2024

(87) PCT Pub. No.: WO2023/144573
PCT Pub. Date: Aug. 3, 2023

(65) Prior Publication Data
US 2025/0104711 A1 Mar. 27, 2025

(51) Int. Cl.
*G10L 15/22* (2006.01)
*B60R 16/037* (2006.01)
*G06V 20/58* (2022.01)
*G10L 15/18* (2013.01)

(52) U.S. Cl.
CPC .......... *G10L 15/22* (2013.01); *B60R 16/0373* (2013.01); *G06V 20/58* (2022.01); *G10L 15/1815* (2013.01); *G10L 2015/223* (2013.01)

(58) Field of Classification Search
CPC ... B60R 16/0373; B60R 25/01; B60R 25/257; B60R 25/305; G05B 13/027; G06F 21/32; G06F 3/167; G06N 3/08; G06N 3/0464; G06N 3/09; G06V 10/25; G06V 20/59; G06V 20/58; G10L 17/00; G10L 17/06;
(Continued)

(56) References Cited

U.S. PATENT DOCUMENTS 7,750,795 B2 7/2010 Nagata
11,508,368 B2 11/2022 Suzuki et al.
2008/0316009 A1 12/2008 Nagata
(Continued)

FOREIGN PATENT DOCUMENTS

JP 2006-193138 A 7/2006
JP 2006-343829 A 12/2006
(Continued)

*Primary Examiner* — Linda Wong
(74) *Attorney, Agent, or Firm* — Osha Bergman Watanabe & Burton LLP

(57) ABSTRACT

A voice recognition method for acquiring utterance content of a user of a vehicle and estimating a target object mentioned in the utterance content, the voice recognition method including: acquiring, as an input signal, at least one of a control signal of a device mounted on the vehicle and an output signal of a sensor mounted on the vehicle; recognizing an expression representing a state or a position from the utterance content; detecting a state or a position of a candidate of the target object, based on the input signal; and estimating a candidate of the target object fitting a state or a position recognized from the utterance content to be a target object mentioned in the utterance content.

19 Claims, 3 Drawing Sheets

(58) Field of Classification Search
CPC ..... G10L 17/18; G10L 15/22; G10L 15/1815; G10L 2015/223; G10L 15/1822
See application file for complete search history.

(56) References Cited

U.S. PATENT DOCUMENTS

| | | | | |
|---|---|---|---|---|
| 2016/0267909 | A1 | 9/2016 | Hanaoka | |
| 2017/0021768 | A1* | 1/2017 | Jaegal | G06F 3/165 |
| 2019/0266908 | A1* | 8/2019 | Tsuchiya | G09B 7/00 |
| 2020/0051567 | A1 | 2/2020 | Ramic et al. | |
| 2020/0251108 | A1 | 8/2020 | Suzuki et al. | |
| 2021/0347328 | A1* | 11/2021 | Bhattacharya | B60R 25/01 |
| 2022/0134880 | A1* | 5/2022 | Lee | B60K 35/22<br>715/727 |

FOREIGN PATENT DOCUMENTS

| | | | |
|---|---|---|---|
| JP | 2010-281855 | A | 12/2010 |
| JP | 2015-089697 | A | 5/2015 |
| JP | 2019-127192 | A | 8/2019 |
| JP | 2019-183504 | A | 10/2019 |
| JP | 2020-126166 | A | 8/2020 |

* cited by examiner

FIG. 3

| ROW | COMMAND ID | TARGET OBJECT CANDIDATE | KEYWORD | INPUT SIGNAL |
|---|---|---|---|---|
| 1 | id0001 | EV SYSTEM WARNING LAMP | RED COLOR, VEHICLE, ARROW, TURNED-ON | FLAG F1 |
| 2 | id0002 | WATER TEMPERATURE WARNING LAMP | RED COLOR, THERMOMETER, WAVE, TURNED-ON | FLAG F2 |
| 3 | id0003 | ALARM DEVICE | BLEEP | FLAG F3 |
| 4 | id0004 | DRIVER SEAT WINDOW | HERE | FLAG F4 |
| 5 | id0005 | ENGINE | STRANGE SOUND | FLAG F5 |
| 6 | id0006 | RIGHT REAR-SIDE VEHICLE | COMING CLOSE | FLAG F6, DISTANCE INFORMATION, SPEED INFORMATION |
| | ⋮ | ⋮ | ⋮ | ⋮ |

FIG. 4

| ROW | UTTERANCE INTENTION | COMMAND ID | RESPONSE MESSAGE | RESPONSE COMMAND |
|---|---|---|---|---|
| 1 | INQUIRY OF MEANING | id0001 | It means that abnormality has occurred in the EV system. | command C001 |
| 2 | INQUIRY OF STATE | id0002 | The temperature of engine coolant is high. | command C002 |
| 3 | INQUIRY OF MEANING | id0003 | Stop the car at a safe place. | command C003 |
| 4 | OPENING OF WINDOW | id0004 | | command C004 |
| 5 | INQUIRY OF CAUSE OF ABNORMAL STRANGE SOUND | id0005 | The quantity of engine oil seems to be insufficient. | command C005 |
| 6 | INQUIRY OF SURROUNDING SITUATION | id0006 | A vehicle is coming close to this car on the right rear side. | command C006 |
| | ⋮ | ⋮ | ⋮ | ⋮ |

VOICE RECOGNITION METHOD AND VOICE RECOGNITION DEVICE

TECHNICAL FIELD

The present invention relates to a voice recognition method and a voice recognition device.

BACKGROUND ART

In PTL 1 described below, an in-vehicle system in which when a warning lamp in a meter panel is turned on, a content description and a coping method of a warning relating to the turned-on warning lamp are displayed on a display device is described.

CITATION LIST

Patent Literature

PTL1: JP 2006-193138 A

SUMMARY OF INVENTION

Technical Problem

Recent years, input systems that, using voice recognition, respond to a question from a user and perform operation of a device have been proposed. Such a system estimates an instruction that the user intends to input into the system, from utterance content of the user.

In order for the input system to accurately identify an instruction in this case, several keywords need to be accurately uttered. However, it is difficult for a user to accurately utter an instruction in every scene. For example, when a user uses a voice input system while performing other work, such as a case where the user is driving a vehicle, it is difficult for the user to figure out a keyword to execute an instruction.

An object of the present invention is to, in voice recognition in which utterance content of a user of a vehicle is acquired and a target object mentioned in the utterance content is estimated, improve estimation precision of the target object mentioned in the utterance content.

Solution to Problem

According to an aspect of the present invention, there is provided a voice recognition method for acquiring utterance content of a user of a vehicle and estimating a target object mentioned in the utterance content, the voice recognition method including: acquiring, as an input signal, at least one of a control signal of a device mounted on the vehicle and an output signal of a sensor mounted on the vehicle; recognizing an expression representing a state or a position from the utterance content; detecting a state or a position of a candidate of the target object, based on the input signal; and estimating a candidate of the target object fitting a state or a position recognized from the utterance content to be a target object mentioned in the utterance content.

Advantageous Effects of Invention

According to an aspect of the present invention, it is possible to, in voice recognition in which utterance content of a user of a vehicle is acquired and a target object mentioned in the utterance content is estimated, improve estimation precision of the target object mentioned in the utterance content.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 3 is a schematic diagram of an example of a command list;

FIG. 4 is a schematic diagram of an example of a response list; and

DESCRIPTION OF EMBODIMENTS

Configuration

Figure 1:
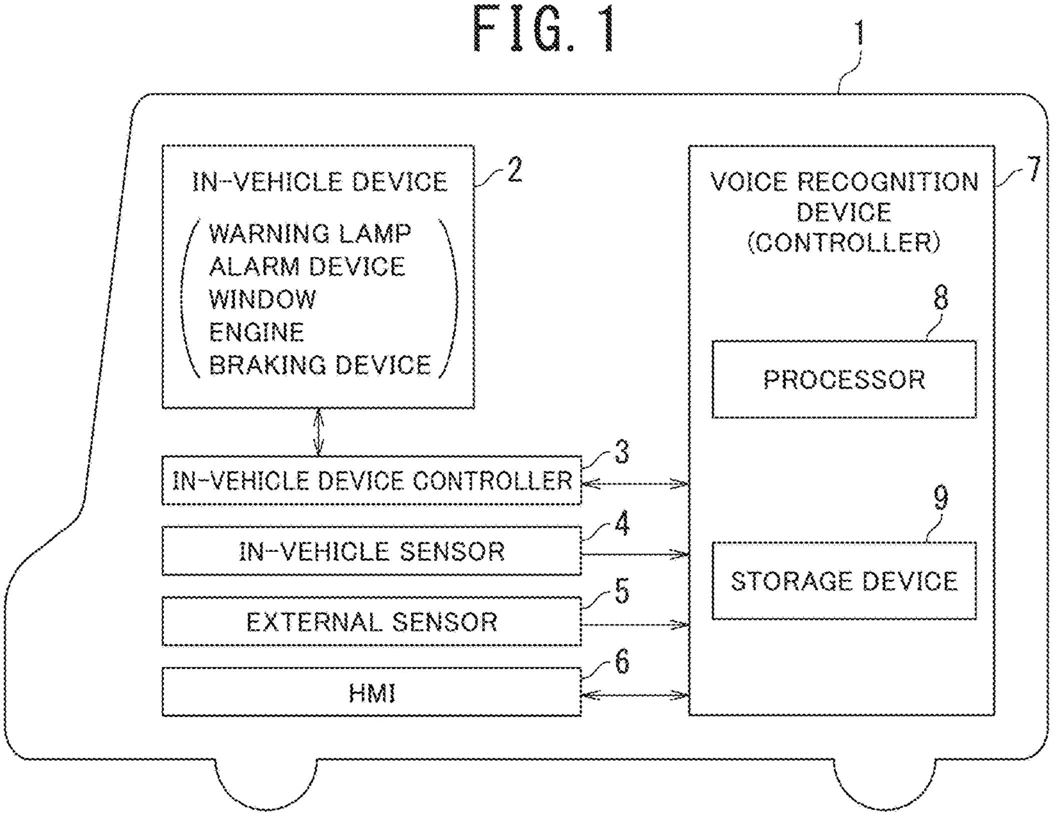
FIG. 1 is a schematic configuration diagram of an example of a vehicle that includes a voice recognition device of an embodiment.

FIG. 1 is a schematic configuration diagram of an example of a vehicle that includes a voice recognition device of an embodiment. A vehicle 1 includes in-vehicle devices 2, an in-vehicle device controller 3, an in-vehicle sensor 4, an external sensor 5, a human-machine interface (hereinafter, referred to as "HMI") 6, and a voice recognition device 7.

The in-vehicle devices 2 are various types of devices mounted on the vehicle 1. An in-vehicle device 2 may be, for example, an instrument panel in front of a driver seat of the vehicle 1 or a warning lamp arranged around an A-pillar. The warning lamp is an example of a visual information presentation device that is installed inside the vehicle 1 and that presents visual information to a user.

In addition, for example, an in-vehicle device 2 may be an alarm device that outputs an alarm sound to, for example, the user of the vehicle 1. The alarm device is an example of an audio information presentation device that is installed inside the vehicle and that presents audio information to the user.

In addition, for example, an in-vehicle device 2 may be a window installed in a door of the vehicle 1 or an engine or a braking device of the vehicle 1.

The in-vehicle device controller 3 is an electronic control unit (ECU) that controls operation of the in-vehicle devices 2 and generates control signals to control the in-vehicle devices 2. The in-vehicle device controller 3 includes, for example, a processor and peripheral components, such as a storage device. The processor may be, for example, a central processing unit (CPU) or a micro-processing unit (MPU).

The storage device may include a semiconductor storage device, a magnetic storage device, an optical storage device, or the like. The storage device may include registers, a cache memory, and a memory, such as a read only memory (ROM) and a random access memory (RAM), that is used as a main storage device.

Note that the in-vehicle device controller 3 may be formed using dedicated hardware for performing various types of information processing that will be described below. For example, the in-vehicle device controller 3 may include a functional logic circuit that is implemented in a general-purpose semiconductor integrated circuit. For example, the in-vehicle device controller 3 may include a programmable logic device (PLD), such as a field-programmable gate array (FPGA), and the like.

The in-vehicle sensor 4 is a sensor that detects a state of the inside of the vehicle 1. For example, the in-vehicle sensor 4 may be an in-vehicle camera that captures an image of the inside of the vehicle 1, a pressure sensor or a seat belt sensor that is installed in a seat and is to determine whether or not a passenger is seated, a biosensor that detects biometric information of a passenger, or a microphone that detects a sound generated from the vehicle 1. The external sensor 5 is a sensor that detects an object existing around the vehicle 1. For example, the external sensor 5 may be, for example, an external camera that captures an image of a surrounding environment around the vehicle 1 or a range sensor, such as a laser range finder (LRF), a radar, and a light detection and ranging (LiDAR).

The HMI 6 is an interface device that transfers information between the voice recognition device 7 and the user. The HMI 6 includes a display device that is visually recognizable by the user of the vehicle 1 (for example, a display screen of a navigation system) and a speaker or a buzzer to output an alarm sound, a notification sound, and voice information.

In addition, the HMI 6 includes a voice input device (for example, a microphone) that acquires voice input from the user.

The voice recognition device 7 is an electronic control unit (ECU) that operates as a controller performing voice recognition to recognize utterance content of the user of the vehicle 1. The voice recognition device 7 estimates a target object mentioned in the utterance content of the user and provides the user with information related to the target object by outputting the information from the HMI 6. Alternatively, the voice recognition device 7 operates the target object mentioned in the utterance content of the user.

The voice recognition device 7 includes a processor 8 and peripheral components, such as a storage device 9. The processor 8 may be, for example, a CPU or an MPU.

The storage device 9 may include a semiconductor storage device, a magnetic storage device, an optical storage device, or the like. The storage device 9 may include registers, a cache memory, and a memory, such as a ROM and a RAM, that is used as a main storage device. Functions of the voice recognition device 7, which will be described below, are achieved by, for example, the processor 8 executing computer programs stored in the storage device 9.

Note that the voice recognition device 7 may be formed using dedicated hardware for performing various types of information processing that will be described below. For example, the voice recognition device 7 may include a functional logic circuit that is implemented in a general-purpose semiconductor integrated circuit. For example, the voice recognition device 7 may include a programmable logic device, such as a field-programmable gate array, and the like.

Figure 2:
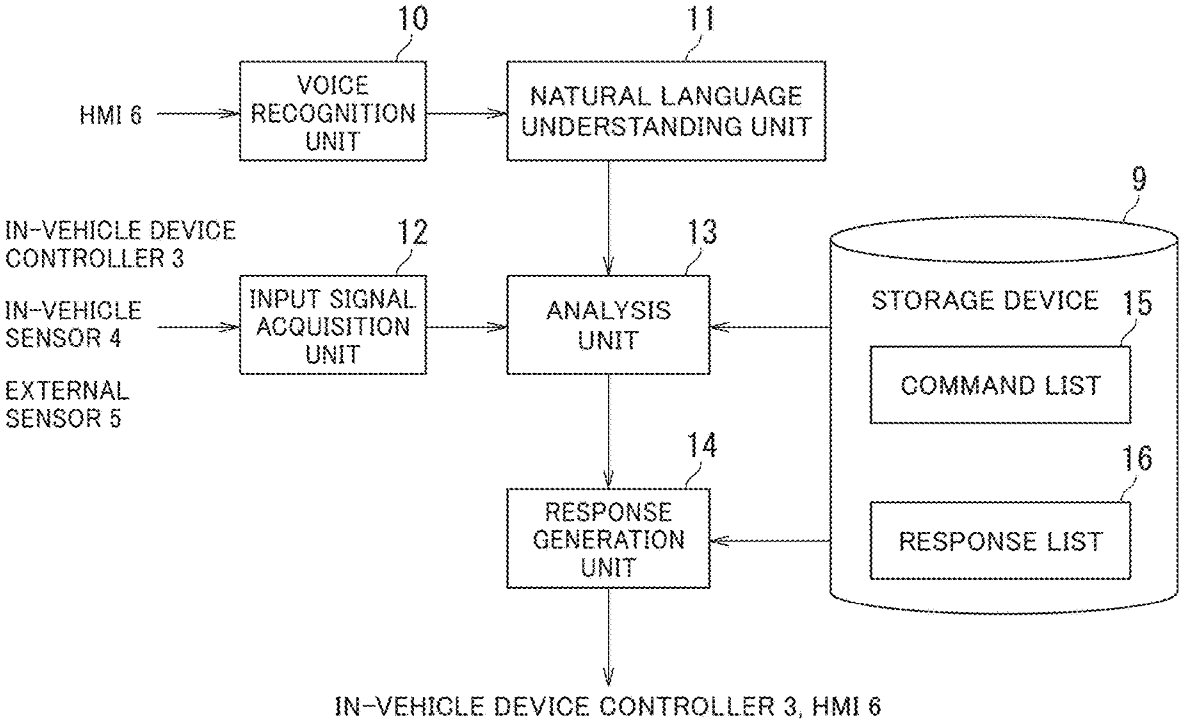
FIG. 2 is a block diagram illustrative of an example of a functional configuration of the voice recognition device.

FIG. 2 is a block diagram illustrative of an example of a functional configuration of the voice recognition device 7. The voice recognition device 7 functions as a voice recognition unit 10, a natural language understanding unit 11, an input signal acquisition unit 12, an analysis unit 13, and a response generation unit 14. The voice recognition unit 10 recognizes voice input from the user that the HMI 6 acquired and converts the voice input to language information, such as a text. The voice recognition unit 10 outputs the language information generated by converting the voice input, to the natural language understanding unit 11.

The natural language understanding unit 11 analyzes language information output from the voice recognition unit 10 through natural language processing and extracts utterance intention of the user and a keyword related to the utterance intention. For example, the natural language understanding unit 11 extracts a keyword indicating a state or a position of a target object mentioned in utterance content. In addition, the natural language understanding unit 11 may extract a keyword indicating a form (shape, color, or position) of the target object in an auxiliary manner.

For example, keywords and synonyms thereof may be defined in advance, and a synonym included in utterance content of the user may be converted to a corresponding keyword.

For example, when in order to question the meaning of the warning lamp, the user utters, "What does the red lamp of the car that has just been turned on mean?", the natural language understanding unit 11 extracts "inquiry of meaning" as an utterance intention and extracts "red color", "turned-on", and "vehicle" as keywords.

In this case, it is only required that, for example, "red-colored", "red color", "red", "vermilion color", and the like are defined in advance as synonyms of the keyword "red color", "vehicle", "car", "automobile", "passenger vehicle", and the like are defined in advance as synonyms of the keyword "vehicle", and "is turned on", "has just been turned on", "turned-on", "being lit", and the like are defined in advance as synonyms of the keyword "turned-on".

In addition, utterance intentions of the user that the natural language understanding unit 11 extracts include various utterance intentions, such as "inquiry of a state" questioning a state of an in-vehicle device 2, an operation instruction instructing an operation of an in-vehicle device 2 (for example, "opening of a window"), "inquiry of a cause of an abnormal sound" questioning a cause of an abnormal sound generated from the vehicle 1, and "question of a surrounding situation" questioning a situation in surroundings around the vehicle 1.

The natural language understanding unit 11 outputs information about extracted utterance intention and information about extracted keywords to the analysis unit 13.

The input signal acquisition unit 12 acquires a control signal of each in-vehicle device 2 that the in-vehicle device controller 3 generated, as an input signal. For example, the control signal maybe a turning-on/off signal of the warning lamp. In addition, for example, the control signal may be a signal that instructs output or suspension of an alarm sound by the alarm device.

In addition, the input signal acquisition unit 12 acquires output signals of the in-vehicle sensor 4 and the external sensor 5 as input signals.

The input signal acquisition unit 12 converts an acquired control signal of an in-vehicle device 2 and acquired output signals of the in-vehicle sensor 4 and the external sensor 5 to signals in a specific data form that is determined in advance to represent a detected situation.

For example, the input signal acquisition unit 12 may convert a control signal to flag information and set a value of a flag according to a control state of an in-vehicle device 2. For example, the input signal acquisition unit 12 may set a value of a flag F1 to "True" when an electric vehicle (EV) system warning lamp is turned on, and set the value of the flag F1 to "False" when the EV system warning lamp is not turned on.

In addition, for example, the input signal acquisition unit 12 may set a value of a flag F3 to "True" when the alarm device operates and outputs an alarm sound, and set the value of the flag F3 to "False" when the alarm device does not output an alarm sound.

In addition, for example, the input signal acquisition unit 12 may convert output signals of the in-vehicle sensor 4 and the external sensor 5 to flag information and set a value of a flag according to a state or a position of an object that the in-vehicle sensor 4 and the external sensor 5 detected.

For example, the input signal acquisition unit 12 may set a flag according to a position of the user inside the vehicle that is detected based on an output signal of the in-vehicle sensor 4, such as the in-vehicle camera, the pressure sensor, the seat belt sensor, and the biosensor. For example, the input signal acquisition unit 12 may set a value of a flag F4 to "True" when the user is seated on the driver seat, and set the value of the flag F4 to "False" when the user is seated on a passenger seat.

In addition, for example, the input signal acquisition unit 12 may set a flag matching a position of an object around the vehicle 1 that is detected based on an output signal of the external sensor 5, such as the external camera and the range sensor. For example, the input signal acquisition unit 12 may set a value of a flag F6 to "True" when another vehicle comes close to the vehicle 1 on the right rear side of the vehicle 1, and set the value of the flag F6 to "False" when no other vehicle comes close to the vehicle 1. In addition, for example, the input signal acquisition unit 12 may set the value of the flag F6 to "True" when speed of another vehicle traveling on the right rear side of the vehicle 1 exceeds a threshold value Vth, and set the value of the flag F6 to "False" when the speed of the another vehicle does not exceed the threshold value Vth.

In addition, for example, the input signal acquisition unit 12 may analyze sound information that the microphone of the in-vehicle sensor 4 output and estimate, based on characteristics of the sound information, an in-vehicle device 2 that serves as a sound source of an abnormal sound generated from the vehicle 1 and a cause of the abnormal sound. The input signal acquisition unit 12 may set a flag, based on the in-vehicle device 2 serving as a sound source and a cause of the abnormal sound. For example, the input signal acquisition unit 12 may set a value of a flag F5 to "True" when a sound source of an abnormal sound is estimated to be the engine of the vehicle and a cause of the abnormal sound is estimated to be insufficiency of engine oil, and set the value of the flag F5 to "False" when no abnormal sound is detected. The input signal acquisition unit 12 may likewise set a flag with respect to an abnormal sound generated from the braking device. In addition, the input signal acquisition unit 12 may separately set a flag with respect to each of a plurality of abnormal sounds that the same in-vehicle device 2 generates due to different causes. Herein, in the estimation of a cause of an abnormal sound, the input signal acquisition unit 12 may perform frequency analysis on sound information acquired from the microphone of the in-vehicle sensor 4 and pre-stored sound information from an in-vehicle device in a normal state, and determine that the in-vehicle device is abnormal when a predetermined frequency pattern or a pattern of parameters including the frequency pattern is detected. In addition, when the sound source of the abnormal sound is the engine, the input signal acquisition unit 12 may store in advance sound information in the case where engine oil is insufficient, and when, as a result of performing frequency analysis on sound information acquired from the microphone in comparison with the pre-stored sound information, frequency characteristics having a difference exceeding a certain extent from a frequency pattern of a sound from a normally operating engine are obtained, determine that the cause of the abnormal sound is insufficiency of the engine oil.

In addition, the input signal acquisition unit 12 may convert control signals of the in-vehicle devices 2 and output signals of the in-vehicle sensor 4 and the external sensor 5 to numerical data, identification information, text data, or the like representing information extracted from the signals. For example, the input signal acquisition unit 12 may convert an output signal of the external sensor 5 to numerical data, such as distance information (for example, "10 m") to another vehicle and speed information (for example, "60 km/h") of another vehicle, or identification information or text data indicating a type of vehicle that are detected based on the output signal of the external sensor 5.

The input signal acquisition unit 12 outputs the input signal after conversion (hereinafter, simply referred to as "input signal") to the analysis unit 13.

The analysis unit 13 receives an input signal output from the input signal acquisition unit 12 and information about utterance intention and information about keywords output from the natural language understanding unit 11.

The analysis unit 13 detects, based on the input signal output from the input signal acquisition unit 12, a state or a position of a candidate of the target object mentioned in utterance content of the user.

For example, the analysis unit 13 detects a control state of an in-vehicle device 2 controlled by a control signal, as a state of a candidate of the target object. For example, the analysis unit 13 may detect whether the warning lamp is in a turned-on state or a turned-off state (that is, a display state of visual information by the visual information presentation device).

When a state or a position of a candidate of the target object is to be detected, the analysis unit 13 refers to a command list 15 stored in the storage device 9. FIG. 3 is a schematic diagram of an example of the command list 15.

In the command list 15, records in a plurality of rows are stored. In each record, a command ID, information about a candidate of the target object, keywords related to the candidate of the target object, and information specifying an input signal that is used in detection of a state or a position of the candidate of the target object are recorded. That is, in the command list 15, command IDs, information about candidates of the target object, keywords, and information specifying input signals are recorded in association with one another. Note that as keywords related to a candidate of the target object, keywords indicating a state or a position of the candidate of the target object are recorded. Keywords indicating a form of the target object may be recorded depending on a candidate of the target object.

For example, in a record in the first row, the flag F1 of the input signal is specified as input information indicating a state of the EV system warning lamp, which is an example of the warning lamp. The analysis unit 13 detects whether the EV system warning lamp is in the turned-on state or the turned-off state, based on the flag F1.

In addition, for example, the analysis unit 13 detects whether outputting of an alarm by the alarm device is in an output state or a suspended state (that is, a notification state of audio information by the audio information presentation device).

For example, in a record in the third row of the command list 15, the flag F3 of the input signal is specified as input information indicating a state of the alarm device. The analysis unit 13 detects whether the alarm device is in the output state or the suspended state, based on the flag F3.

In addition, for example, the analysis unit 13 detects an in-vehicle device 2 that is arranged at a specific position, as a candidate of the target object mentioned in utterance content of the user. That is, the analysis unit 13 detects a position of an in-vehicle device 2 that serves as a candidate of the target object.

For example, in a record in the fourth row of the command list 15, the flag F4 of the input signal is specified as information indicating whether or not a window serving as a candidate of the target object is a driver seat window. The flag F4 is set to "True" when the user is seated on the driver seat, and set to "False" when the user is not seated on the driver seat. The analysis unit 13 detects that the driver seat window is a window that is a candidate of the target object when the flag F4 is "True", and detects that the driver seat window is not a window that is a candidate of the target object when the flag F4 is "False".

In addition, for example, the analysis unit 13 may detect whether or not a sound source of an abnormal sound generated from the vehicle 1 is a specific in-vehicle device 2. That is, the analysis unit 13 may detect whether or not an in-vehicle device 2 that is a candidate of the target object is a sound source of an abnormal sound, as a state of the candidate of the target object. The analysis unit 13 may also estimate a cause of the abnormal sound.

For example, in a record in the fifth row of the command list 15, the flag F5 of the input signal is specified as information indicating whether or not the engine serving as a candidate of the target object is a sound source of an abnormal sound. When the flag F5 is "True", the analysis unit 13 estimates that the engine is the sound source of the abnormal sound and the cause of the abnormal sound is insufficiency of engine oil. When the flag F5 is "False", the analysis unit 13 detects that the engine is not the sound source of the abnormal sound.

In addition, for example, the analysis unit 13 may detect a state or a position of an object around the vehicle 1 as a state or a position of a candidate of the target object.

For example, in a record in the sixth row of the command list 15, the flag F6 of the input signal is specified as information indicating whether or not another vehicle comes close to the vehicle 1 on the right rear side of the vehicle 1. The analysis unit 13 detects that another vehicle comes close to the vehicle 1 on the right rear side of the vehicle 1 when the flag F6 is "True", and detects that no other vehicle comes close to the vehicle 1 on the right rear side of the vehicle 1 when the flag F6 is "False".

In addition, the analysis unit 13 may detect distance to another vehicle traveling on the right rear side of the vehicle 1 (that is, a position of the another vehicle), based on distance information (for example, "10 m") included in the input signal. In addition, the analysis unit 13 may detect speed of the another vehicle traveling on the right rear side of the vehicle 1 (that is, speed of the another vehicle), based on speed information (for example, "60 km/h") included in the input signal.

Note that, the analysis unit 13 may store a received input signal in the storage device 9. The analysis unit 13 may detect a state or a position of a candidate of the target object, based on the input signal stored in the storage device 9 in addition to or in place of an input signal that is currently being input. In addition, for example, the analysis unit 13 may detect a state or a position of a candidate of the target object, based on a time series composed of an input signal having been input in the past and an input signal currently being input. The analysis unit 13 may store the input signal having been input in the past and estimate a state of a candidate of the target object by detecting a difference between the stored input signal in the past and a current input signal (a difference between True and False). In addition, the analysis unit 13 may, for example, store distance information to another vehicle on the right rear side of the vehicle 1 included in a past input signal and estimate that another vehicle comes close to the vehicle 1 on the right rear side of the vehicle 1 when current distance information is less than the past distance information.

The analysis unit 13 estimates that a candidate of the target object that fits a state or a position that information about a keyword output from the natural language understanding unit 11 (that is, a state or a position of the target object mentioned in the utterance content of the user) indicates is the target object mentioned in the utterance content.

Specifically, when the state or the position that the information about a keyword output from the natural language understanding unit 11 indicates and the state or the position of the candidate of the target object detected from the input signal fit each other, the analysis unit 13 estimates that the candidate of the target object is the target object mentioned in the utterance content.

For example, a case is assumed where the user utters, "What does the red lamp of the car that has just been turned on mean?" and the natural language understanding unit 11 extracts a keyword "turned-on" that indicates a state of a candidate of the target object and keywords "red color" and "vehicle" that indicate a form (shape, color, and position) of the target object.

The analysis unit 13 refers to the command list 15 and selects the record in the first row (the EV system warning lamp) and a record in the second row (a water temperature warning lamp) that include the same keyword as the keyword "turned-on" that the natural language understanding unit 11 extracted.

The analysis unit 13 determines, based on the flag F1 specified in the record in the first row, whether or not the EV system warning lamp is in the turned-on state. That is, the analysis unit 13 determines whether or not the state of the candidate of the target object is the same state as a state indicated by the keyword "turned-on", which is included in the command list 15 and indicates a state of a candidate of the target object.

When the state of the candidate of the target object is the same state as the state indicated by the keyword "turned-on" included in the command list 15, the analysis unit 13 determines that the state of the target object mentioned in the utterance content of the user and the state of the EV system warning lamp fit each other, and estimates that the target object mentioned in the utterance content is the EV system warning lamp.

The analysis unit 13 outputs a command ID "id0001" in the record in the first row to the response generation unit 14. Since a command ID is associated with information about a candidate of the target object, keywords related to the candidate of the target object, and an input signal, a target object mentioned in the utterance content of the user and a state or a position of the target object can be identified based on the command ID.

In addition, the analysis unit 13 outputs information about utterance intention output from the natural language understanding unit 11, to the response generation unit 14.

Note that a case is assumed where in addition to the EV system warning lamp, the water temperature warning lamp is also in a turned-on state. Since then, the state of the water temperature warning lamp is also brought into the same state as the state indicated by the keyword "turned-on" included in the command list 15, whether the target object mentioned in the utterance content is the EV system warning lamp or the water temperature warning lamp cannot be discriminated only by the keyword "turned-on" indicating a state of a candidate of the target object.

In this case, the analysis unit 13 may use the keywords "red color" and "vehicle" indicating a form of a target object, in an auxiliary manner and thereby determine a target object mentioned in the utterance content.

Next, a case is assumed where the user utters, "What does the bleep that has just sounded means?" and the natural language understanding unit 11 extracts a keyword "bleep" that indicates a state of a candidate of the target object. The analysis unit 13 refers to the command list 15 and selects the record in the third row (the alarm device) that includes the same keyword as the keyword "bleep" that the natural language understanding unit 11 extracted.

The analysis unit 13 determines, based on the flag F3 specified in the record in the third row, whether or not the alarm device is in the output state. That is, the analysis unit 13 determines whether or not the state of the candidate of the target object is the same state (operating state) as a state indicated by the keyword "bleep", which is included in the command list 15 and indicates a state of a candidate of the target object. When the state of the candidate of the target object is the same state as a state indicated by a keyword included in the command list 15, the analysis unit 13 determines that the state of the target object mentioned in the utterance content of the user and the state of the alarm device fit each other, and estimates that the target object mentioned in the utterance content is the alarm device. The analysis unit 13 outputs a command ID "id0003" in the record in the third row and information about the utterance intention output from the natural language understanding unit 11, to the response generation unit 14.

In addition, for example, a case is assumed where the user utters, "Open the window here." and the natural language understanding unit 11 extracts a keyword "here" that indicates a position of a candidate of the target object.

The analysis unit 13 refers to the command list 15 and selects the record in the fourth row (the driver seat window) that includes the same keyword as the keyword "here" that the natural language understanding unit 11 extracted.

The analysis unit 13 determines, based on the flag F4 specified in the record in the fourth row, whether or not a position (that is, a vicinity of the driver seat) of a candidate of the target object (the driver seat window) is the same as a position indicated by the keyword "here", which is included in the command list 15 and indicates a position of a candidate of the target object, that is, a vicinity of a position where the user is seated. Since when the flag F4 is "True", the position where the user is seated is the driver seat, the analysis unit 13 determines that the position of the candidate of the target object is the same position as a position indicated by the keyword included in the command list 15.

When the position of the candidate of the target object is the same position as a position indicated by a keyword included in the command list 15, the analysis unit 13 determines that the position of the target object mentioned in the utterance content of the user and the position of the driver seat window fit each other, and estimates that the target object mentioned in the utterance content is the driver seat window. The analysis unit 13 outputs a command ID "id0004" in the record in the fourth row and information about the utterance intention output from the natural language understanding unit 11, to the response generation unit 14.

In addition, for example, a case is assumed where the user utters, "I can hear a strange sound. Is it OK?" and the natural language understanding unit 11 extracts a keyword "strange sound" that indicates a state of a candidate of the target object.

The analysis unit 13 refers to the command list 15 and selects the record in the fifth row (the engine) that includes the same keyword as the keyword "strange sound" that the natural language understanding unit 11 extracted.

The analysis unit 13 determines, based on the flag F5 specified in the record in the fifth row, whether or not the engine serves as a sound source of the abnormal sound. That is, the analysis unit 13 determines whether or not the state of a candidate of the target object (the engine) is the same state as a state of generating a strange sound that is indicated by the keyword "strange sound", which is included in the command list 15 and indicates a state of a candidate of the target object. When the state of the candidate of the target object is the same state as a state indicated by a keyword included in the command list 15, the analysis unit 13 determines that the state of the target object mentioned in the utterance content of the user and the state of the engine fit each other, and estimates that the target object mentioned in the utterance content is the engine. In addition, the analysis unit 13 estimates that the cause of the abnormal sound is insufficiency of the engine oil. The analysis unit 13 outputs a command ID "id0005" in the record in the fifth row and information about the utterance intention output from the natural language understanding unit 11, to the response generation unit 14.

In addition, for example, a case is assumed where the user utters, "What is coming close to this car at a tremendous speed?" and the natural language understanding unit 11 extracts a keyword "coming close" that indicates a state of a candidate of the target object.

The analysis unit 13 refers to the command list 15 and selects the record in the sixth row (a right rear-side vehicle) that includes the same keyword as the keyword "coming close" that the natural language understanding unit 11 extracted.

The analysis unit 13 determines, based on the flag F6 specified in the record in the sixth row, whether or not a right rear-side vehicle is coming close to the vehicle 1. That is, the analysis unit 13 determines whether or not the state of the candidate of the target object (the right rear-side vehicle) is the same state as a state indicated by the keyword "coming close", which is included in the command list 15 and indicates a state of a candidate of the target object. The analysis unit 13 may determine, based on position information and speed information specified in the record in the sixth row, whether or not the right rear-side vehicle is coming close to the vehicle 1. When the state of the candidate of the target object is the same state as a state indicated by a keyword included in the command list 15, the analysis unit 13 determines that the state of the target object mentioned in the utterance content of the user and the state of the right rear-side vehicle fit each other, and estimates that the target object mentioned in the utterance content is the right rear-side vehicle. The analysis unit 13 outputs a command ID "id0006" in the record in the thirdsixth row and information about the utterance intention output from the natural language understanding unit 11, to the response generation unit 14.

FIG. 2 is now referred to. The response generation unit 14 outputs a response message and a response command, based on information about utterance intention that the natural language understanding unit 11 extracts and that is input via the analysis unit 13 and a command ID that is output from the analysis unit 13.

The response message is a sound signal or text information of a message to be presented to the user in response to utterance content of the user. The response command is a command signal that causes the HMI 6 to output a response message and causes an in-vehicle device 2 to perform a predetermined operation in response to the utterance content of the user.

The response generation unit 14, when generating a response message and a response command, refers to a response list 16 that is stored in the storage device 9. FIG. 4 is a schematic diagram of an example of the response list 16.

In the response list 16, records in a plurality of rows are stored. In each record, information about utterance intention, a command ID, a response message, and a response command are recorded. That is, in the response list 16, information about utterance intentions, command IDs, response messages, and response commands are recorded in association with one another.

For example, when the user utters, "What does the red lamp of the car that has just been turned on mean?", the natural language understanding unit 11 extracts "inquiry of meaning" as an utterance intention, as described above. The analysis unit 13 outputs the command ID "id0001". The response generation unit 14 extracts a record in the first row that matches the utterance intention "inquiry of meaning" and the command ID "id0001".

The response generation unit 14 outputs a response command "command C001" for notifying meaning of the warning lamp that is stored in the record in the first row to the HMI 6 and causes the speaker of the HMI 6 to emit sound information or the display device of the HMI 6 to display text information of a response message "It means that abnormality has occurred in the EV system". As described above, the command C001 is a command signal to cause the HMI 6 to output a response message, and the same applies to commands C002, C003, C005, and C006 illustrated in FIG. 4.

In addition, for example, a case is assumed where when the user utters, "The red thermometer is turned on. What has happened?", the natural language understanding unit 11 extracts an utterance intention "inquiry of a state" and the analysis unit 13 outputs a command ID "id0002". The response generation unit 14 extracts a record in the second row that matches the utterance intention "inquiry of a state" and the command ID "id0002".

The response generation unit 14 outputs a response message "The temperature of engine coolant is high." notifying a state of a radiator and a response command "command C002" that are stored in the record in the second row, to the HMI 6.

Note that in the response list 16, the utterance intention "inquiry of meaning" may be stored in association with a response message relating to a state of the target object. In this case, the response generation unit 14 can output the response message relating to the state of the target object in response to an utterance having the utterance intention "inquiry of meaning".

Likewise, the utterance intention "inquiry of meaning" may be stored in association with a response message relating to a coping method matching a state of the target object. For example, in a record in the third row, the utterance intention "inquiry of meaning" and the command ID "id0003" are stored. For example, a case is assumed where when the user utters, "What does the red lamp of the thermometer that has just been turned on mean?", the natural language understanding unit 11 extracts the utterance intention "inquiry of meaning" and the analysis unit 13 outputs the command ID "id0003". In this case, the response generation unit 14, by selecting the record in the third row and outputting a response message "Stop the car at a safe place." and a response command "command C003" to the HMI 6, notifies a coping method appropriate for a case where temperature of engine coolant is high.

In addition, for example, a case is assumed where when the user utters, "Open the window here.", the natural language understanding unit 11 extracts an utterance intention "opening of a window" and the analysis unit 13 outputs the command ID "id0004". The response generation unit 14 extracts a record in the fourth row that matches the utterance intention "opening of a window" and the command ID "id0004".

The response generation unit 14 outputs a response command "command C004" that is a command signal to open a driver seat window, to the in-vehicle device controller 3. The in-vehicle device controller 3 opens the driver seat window, which is an example of the in-vehicle device 2, in accordance with the response command "command C004". Note that when the user utters, "Shut the window here.", the response generation unit 14 may output a response command to shut the driver seat window to the in-vehicle device controller 3.

In addition, a case is assumed where when the user utters, "I can hear a strange sound. Is it OK?", the natural language understanding unit 11 extracts an utterance intention "inquiry of a cause of an abnormal sound" and the analysis unit 13 outputs a command ID "id0005". The response generation unit 14 extracts a record in the fifth row that matches the utterance intention "inquiry of a cause of an abnormal sound" and the command ID "id0005".

The response generation unit 14 outputs a response message "The quantity of engine oil seems to be insufficient." notifying a cause of the abnormal sound and a response command "command C005" that are stored in the record in the fifth row, to the HMI 6.

In addition, a case is assumed where when the user utters, "What is coming close to this car at a tremendous speed?", the natural language understanding unit 11 extracts an utterance intention "inquiry of a surrounding situation" and the analysis unit 13 outputs a command ID "id0006". The response generation unit 14 extracts a record in the sixth row that matches the utterance intention "inquiry of a surrounding situation" and the command ID "id0006".

The response generation unit 14 outputs a response message "A vehicle is coming close to this car on the right rear side." notifying a surrounding situation and a response command "command C006" that are stored in the record in the sixth row, to the HMI 6.

Operation

Figure 5:
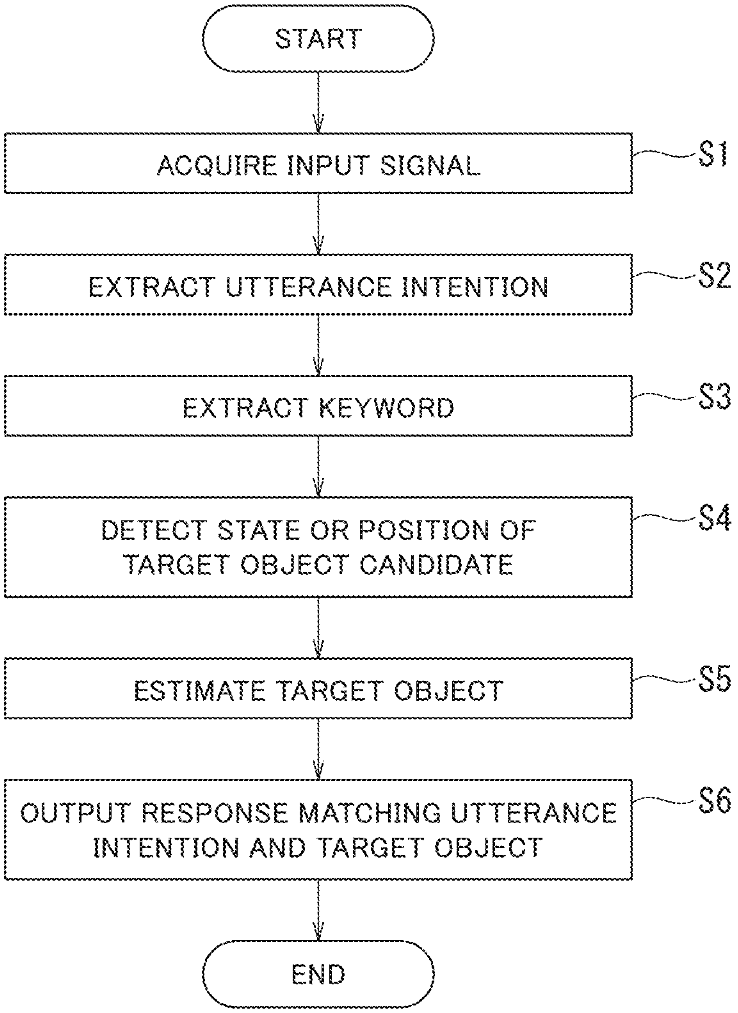
FIG. 5 is a flowchart of an example of a voice recognition method of the embodiment.

FIG. 5 is a flowchart of an example of a voice recognition method of the embodiment.

In step S1, the input signal acquisition unit 12 acquires control signals of the in-vehicle devices 2 that the in-vehicle device controller 3 generated and output signals of the in-vehicle sensor 4 and the external sensor 5, as input signals.

In step S2, the voice recognition unit 10 recognizes voice input from the user that the HMI 6 acquired and converts the voice input to language information, such as a text. The natural language understanding unit 11 analyzes the language information output from the voice recognition unit 10 through natural language processing and extracts utterance intention of the user. In step S3, the natural language understanding unit 11 extracts a keyword related to the utterance intention from the language information output from the voice recognition unit 10.

In step S4, the analysis unit 13 detects, based on the input signals that the input signal acquisition unit 12 acquired, a state or a position of a candidate of a target object mentioned in utterance content of the user.

In step S5, the analysis unit 13 estimates, based on information about the keyword that the natural language understanding unit 11 extracted, a candidate of the target object that fits the state or the position recognized from the utterance content to be the target object mentioned in the utterance content.

In step S6, the response generation unit 14 outputs a response message according to the utterance intention that the natural language understanding unit 11 extracted and the target object that the analysis unit 13 estimated. Alternatively, the response generation unit 14 causes an in-vehicle device 2 to operate.

Advantageous Effects of Embodiment (1) The voice recognition device 7 acquires utterance content of a user of a vehicle and estimates a target object mentioned in the utterance content. The voice recognition device 7 acquires, as an input signal, at least one of a control signal of a device mounted on a vehicle 1 and an output signal of a sensor mounted on the vehicle 1, recognizes an expression representing a state or a position from the utterance content, detects, based on the input signal, a state or a position of a candidate of the target object, and estimates a candidate of the target object that fits the state or the position recognized from the utterance content to be the target object mentioned in the utterance content.

Because of this configuration, in voice recognition in which utterance content of the user of the vehicle is acquired and a target object mentioned in the utterance content is estimated, estimation precision of the target object mentioned in the utterance content can be improved.

(2) For example, a candidate of the target object may be a device that is controlled by a control signal acquired as an input signal. The voice recognition device 7 may detect a control state controlled by the control signal as a state of the candidate of the target object. Because of this configuration, the state of the candidate of the target object can be determined based on the control signal for controlling the device.

(3) For example, the input signal may be a control signal of a visual information presentation device that is installed inside the vehicle 1 and that presents visual information to the user, and the control state may be a display state of the visual information. Because of this configuration, a state of the visual information presentation device serving as a candidate of the target object can be determined.

(4) For example, the visual information presentation device may be a warning lamp, and the control state may be a turned-on state or a turned-off state of the warning lamp. Because of this configuration, a state of the warning lamp serving as a candidate of the target object can be determined.

(5) For example, the input signal may be a control signal of an audio information presentation device that is installed inside the vehicle 1 and that presents audio information to the user, and the control state may be a notification state of the audio information. Because of this configuration, a state of the audio information presentation device serving as a candidate of the target object can be determined.

(6) For example, the audio information presentation device may be an alarm device, and the control state may be an output state or a suspended state of an alarm. Because of this configuration, a state of the alarm device serving as a candidate of the target object can be determined.

(7) The voice recognition device 7 may store an acquired input signal and detect a state or a position of a candidate of the target object, based on the stored input signal in the past and an input signal currently being acquired. Because of this configuration, even when the state or the position of the target object changes before the user utters, the target object can be estimated based on the past state or position before utterance.

(8) The voice recognition device 7 may output information about a target object mentioned in the utterance content or may output information related to a state of the target object mentioned in the utterance content. The voice recognition device 7 may store a coping method matching the state of a candidate of the target object in a predetermined storage device and output information about a coping method matching the state of the target object mentioned in the utterance content.

Because of this configuration, information about the target object mentioned in the utterance content of the user can be provided.

(9) The candidate of the target object may be a device mounted on the vehicle 1. The voice recognition device 7 may acquire, as an input signal, an output signal of a sensor that detects a state of the inside of the vehicle 1 and detect a state or a position of the device, based on the acquired output signal.

Because of this configuration, the state or the position of the device mounted on the vehicle 1 can be determined based on the output signal of the sensor that detects a state of the inside of the vehicle 1.

(10) The voice recognition device 7 may acquire, as an input signal, an output signal of a sensor that detects a seating position of a passenger of the vehicle 1, detect a window serving as a candidate of the target object to be a window in a vicinity of the seating position, recognize an expression representing a position of a window to be opened from utterance content including an opening instruction to open a window of the vehicle 1, and, when the position of the window recognized from the utterance content indicates a vicinity of the seating position, estimate the window in the vicinity of the seating position as the target object.

From the output signal of the sensor that detects a seating position of the passenger and the utterance content including an opening instruction to open a window of the vehicle 1, it is possible to estimate that the window to be opened is the window in the vicinity of the seating position of the user.

(11) The voice recognition device 7 may, by acquiring, as an input signal, an output signal of a sensor that detects sound information of an abnormal sound from the vehicle 1 and estimating, based on the sound information, a device serving as a sound source of the abnormal sound, detect a state in which the device serving as a candidate of the target object is generating the abnormal sound. Because of this configuration, a state of the device mounted on the vehicle 1 can be estimated based on the output signal of the sensor that detects sound information.

(12) For example, the candidate of the target object may be an object around the vehicle 1. The voice recognition device 7 may acquire, as an input signal, an output signal of a sensor that detects an object in surroundings and detect a state or a position of the object in the surroundings, based on the acquired output signal.

For example, the voice recognition device 7 may acquire, as an input signal, a captured image that a camera to capture an image of the surroundings of the vehicle 1 generates and recognize, based on the captured image, an object coming close to the vehicle 1 as a candidate of the target object.

Because of this configuration, a state or a position of the object around the vehicle 1 can be determined based on the output signal of the sensor that detects an object around the vehicle 1.

(13) For example, the sensor may include one of a pressure sensor, a seat belt sensor, a camera, a range sensor, a microphone, and a biosensor. Because of this configuration, states or positions of various candidates of the target object inside or outside the vehicle can be detected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
2 In-vehicle device
3 In-vehicle device controller
4 In-vehicle sensor
5 External sensor
6 Human-machine interface
7 Voice recognition device
8 Processor
9 Storage device
10 Voice recognition unit
11 Natural language understanding unit
12 Input signal acquisition unit
13 Analysis unit
14 Response generation unit
15 Command list
16 Response list

The invention claimed is:

1. A voice recognition method for acquiring utterance content of a user of a vehicle and estimating at least one target object mentioned in the utterance content, the voice recognition method comprising:

acquiring, as an input signal, at least one of a control signal of a device mounted on the vehicle and an output signal of a sensor mounted on the vehicle;

converting the acquired control signal or the acquired output signal into a specific data form predetermined to represent a detected situation;

recognizing an expression representing a state or a position of the at least one target object from the utterance content and extracting a keyword indicating the state or the position of the at least one target object mentioned in the utterance content;

referring to a command list in which information about candidates of the at least one target object, keywords related to the candidates, and information specifying input signals used in detection of states or positions of the candidates are recorded in associated with one another;

detecting a state or a position of a candidate of the at least one target object based on the information specifying an input signal corresponding to the extracted keyword, the information being recorded in association in the command list;

determining whether or not the state or the position recognized from the utterance content and indicated by the extracted keyword fits the state or the position of the candidate of the at least one target object detected based on the input signal;

estimating a candidate of the at least one target object fitting the state or the position recognized from the utterance content to be the at least one target object mentioned in the utterance content;

outputting a response command, wherein the response command is a command signal that causes the at least one target object to perform a predetermined operation, wherein the at least one target object is a window installed in a door of the vehicle, a braking device of the vehicle, or an engine of the vehicle; and performing, by the window, braking device, or engine, the predetermined operation in response to the command signal.

2. The voice recognition method according to claim 1, wherein the candidate of the at least one target object is a device controlled by the control signal acquired as the input signal, and wherein the method comprises detecting a control state controlled by the control signal as the state of the candidate of the at least one target object.

3. The voice recognition method according to claim 2, wherein the input signal is a control signal of a visual information presentation device, the visual information presentation device being installed inside the vehicle and presenting visual information to the user, and the control state is a display state of the visual information.

4. The voice recognition method according to claim 3, wherein the visual information presentation device is a warning lamp and the control state is a turned-on state or a turned-off state of the warning lamp.

5. The voice recognition method according to claim 2, wherein the input signal is a control signal of an audio information presentation device, the audio information presentation device being installed inside the vehicle and presenting audio information to the user, and the control state is a notification state of the audio information.

6. The voice recognition method according to claim 5, wherein the audio information presentation device is an alarm device and the control state is an output state or a suspended state of an alarm.

7. The voice recognition method according to claim 1, comprising:

storing the acquired input signal; and detecting the state or the position of the candidate of the at least one target object, based on a past stored input signal and the input signal currently being acquired.

8. The voice recognition method according to claim 1, comprising outputting information relating to the at least one target object mentioned in the utterance content.

9. The voice recognition method according to claim 1, comprising outputting information relating to the state of the at least one target object mentioned in the utterance content.

10. The voice recognition method according to claim 1, comprising:

storing a coping method matching the state of the candidate of the at least one target object in a predetermined storage device; and outputting information relating to the coping method matching the state of the at least one target object mentioned in the utterance content.

11. The voice recognition method according to claim 1, wherein the candidate of the at least one target object is the device mounted on the vehicle, and wherein the method further comprises acquiring, as the input signal, an output signal of a sensor detecting a state of an inside of the vehicle and detecting a state or a position of the device, based on the acquired output signal.

12. The voice recognition method according to claim 11, comprising:

acquiring, as the input signal, an output signal of a sensor detecting a seating position of a passenger of the vehicle;

detecting the window serving as the candidate of the at least one target object to be a window in a vicinity of the seating position;

recognizing, from the utterance content including an opening/closing instruction to open or close the window of the vehicle, an expression representing a position of the window to be opened or closed; and when a position of the window recognized from the utterance content indicates the vicinity of the seating position, estimating the window in the vicinity of the seating position as the target object.

13. The voice recognition method according to claim 11, comprising:

acquiring, as the input signal, an output signal of a sensor detecting sound information of an abnormal sound from the vehicle; and by estimating, based on the sound information, a device serving as a sound source of the abnormal sound, detecting a state in which the device serving as the candidate of the at least one target object is generating the abnormal sound.

14. The voice recognition method according to claim 1, wherein the candidate of the at least one target object is a surrounding object of the vehicle, and wherein the method comprises acquiring, as the input signal, an output signal of a sensor detecting the surrounding object and detecting a state or a position of the surrounding object, based on the acquired output signal.

15. The voice recognition method according to claim 14, comprising:

acquiring, as the input signal, a captured image generated by a camera capturing surroundings of the vehicle; and recognizing, based on the captured image, an object coming close to the vehicle as the candidate of the at least one target object.

16. The voice recognition method according to claim 1, wherein the sensor includes one of a pressure sensor, a seat belt sensor, a camera, a range sensor, a microphone, and a biosensor.

17. A voice recognition device configured to acquire utterance content of a user of a vehicle and estimate a target object mentioned in the utterance content, the voice recognition device including a controller configured to execute processing comprising:

acquiring, as an input signal, at least one of a control signal of a device mounted on the vehicle and an output signal of a sensor mounted on the vehicle;

converting the acquired control signal or the acquired output signal into a specific data form predetermined to represent a detected situation;

recognizing an expression representing a state or a position of the at least one target object from the utterance content and extracting a keyword indicating the state or the position of the at least one target object mentioned in the utterance content;

referring to a command list in which information about candidates of the at least one target object, keywords related to the candidates, and information specifying input signals used in detection of states or positions of the candidates are recorded in associated with one another;

detecting a state or a position of a candidate of the at least one target object based on the information specifying an input signal corresponding to the extracted keyword, the information being recorded in association in the command list;

determining whether or not the state or the position recognized from the utterance content and indicated by the extracted keyword fits the state or the position of the candidate of the at least one target object detected based on the input signal;

estimating a candidate of the at least one target object fitting the state or the position recognized from the utterance content to be the at least one target object mentioned in the utterance content;

outputting a response command, wherein the response command is a command signal that causes the at least one target object to perform a predetermined operation, wherein the at least one target object is a window installed in a door of the vehicle, a braking device of the vehicle, or an engine of the vehicle; and performing, by the window, braking device, or engine, the predetermined operation in response to the command signal.

18. The voice recognition device of claim 17, wherein the predetermined operation is opening or closing the window.

19. The voice recognition method of claim 1, wherein the predetermined operation is opening or closing the window.

* * * * *